United States Patent
Zhang (10) Patent No.: US 10,826,665 B2
(45) Date of Patent: Nov. 3, 2020

(54) METHOD AND APPARATUS IN UE AND BASE STATION SUPPORTING NARROWBAND COMMUNICATION

(71) Applicant: SISVEL INTERNATIONAL S.A., Luxembourg (LU)

(72) Inventor: Xiaobo Zhang, Shanghai (CN)

(73) Assignee: SISVEL INTERNATIONAL S.A., Luxembourg (LU)

(*) Notice: Subject to any disclaimer, the term of this patent is extended or adjusted under 35 U.S.C. 154(b) by 87 days.

(21) Appl. No.: 15/959,302

(22) Filed: Apr. 23, 2018

(65) Prior Publication Data
US 2018/0241529 A1    Aug. 23, 2018

Related U.S. Application Data

(63) Continuation-in-part of application No. PCT/CN2016/089584, filed on Jul. 11, 2016.

(30) Foreign Application Priority Data

Oct. 23, 2015   (CN) .......................... 2015 1 0698366

(51) Int. Cl.
*H04L 5/00* (2006.01)
*H04W 76/27* (2018.01)
(Continued)

(52) U.S. Cl.
CPC ............. *H04L 5/0053* (2013.01); *H04W 4/70* (2018.02); *H04W 72/1289* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 7,796,643 B1 * 9/2010 Hilyard ................. H04M 7/129
                                                             370/352
2013/0121249 A1   5/2013 Ji et al.
(Continued)

FOREIGN PATENT DOCUMENTS

| CN | 102594537 A | 7/2012 | |
|----|-------------|--------|---|
| WO | 2013036005 A1 | 3/2013 | |
| WO | WO 2013/036005 A1 * | 3/2013 | ............. H04J 11/00 |

OTHER PUBLICATIONS

3GPP TSG Geran#67, TDOC GP-150784, Agenda Item 7.1.5.3.5.7; 7.2.5.3.4.7, Yin Chaun, China, Aug. 10-13, 2015, Source : Ericsson LM; Nokia Networks; Intel, Title: Narrowband LTE—Downlink Control Information and Scheduling.*

(Continued)

*Primary Examiner* — Peter G Solinsky
*Assistant Examiner* — Sanjay K Dewan
(74) *Attorney, Agent, or Firm* — Maschoff Brennan (57) ABSTRACT

The disclosure discloses a method and apparatus in UE and base station supporting narrowband communication. In one embodiment, a UE receiving a first signaling in step 1, and searching for a second signaling on M searched resources in step 2, the second signaling comprising scheduling information of a target data, the target data being distributed in G time units in time domain; wherein the first signaling indicates a first time unit set, time units occupied by the M searched resources all belong to the first time unit set, the second signaling is a physical layer signaling, the searched resource is distributed in N time units in time domain, the bandwidth occupied by the searched resource in each time unit is not greater than the bandwidth of one PRB, the duration of the time unit is 1 millisecond.

18 Claims, 7 Drawing Sheets

(51) Int. Cl.
*H04W 4/70* (2018.01)
*H04W 72/12* (2009.01)
*H04W 72/04* (2009.01)

(52) U.S. Cl.
CPC .......... *H04W 76/27* (2018.02); *H04L 5/0048* (2013.01); *H04W 72/0406* (2013.01); *Y02D 70/126* (2018.01); *Y02D 70/1226* (2018.01); *Y02D 70/1262* (2018.01); *Y02D 70/20* (2018.01); *Y02D 70/21* (2018.01)

(58) Field of Classification Search
USPC ........................................................ 370/329
See application file for complete search history.

(56) References Cited

U.S. PATENT DOCUMENTS

2013/0250882 A1    9/2013  Dinan
2015/0256403 A1*   9/2015  Li ........................... H04W 4/70
                                                    370/235

OTHER PUBLICATIONS

3GPP Tsg Geran#67, Tdoc Gp-150784, Agenda item 7.1.5.3.5.7; 7.2.5.3.4.7, Yin Chuan, China 10th -13th Aug., 2015, Source : Ericsson Lm; Nokia Networks; Intel.*
3GPP, "Narrowband LTE-Downlink Control Information and Scheduling", 3GPP TSG GERAN#67 GP-150784, Aug. 13, 2015 (Aug. 13, 2015), sections 3.1-3.2.
3GPP, "Narrowband IOT", 3GPP TSG RAN Meeting #69 RP-151621, Sep. 16, 2015 (Sep. 16, 2015), the whole locument.

* cited by examiner

METHOD AND APPARATUS IN UE AND BASE STATION SUPPORTING NARROWBAND COMMUNICATION

CROSS REFERENCE TO RELATED APPLICATION

This application is a continuation-in-part application of International Application No. PCT/CN2016/089584, filed Jul. 11, 2016, published in China on Apr. 24, 2017 as WO2017/067240 A1 under PCT Article 21 (2), and claiming benefit to Chinese Patent Application No. 201510698366.5, filed on Oct. 23, 2015, all of which are hereby incorporated by reference in its entirety for all purposes.

BACKGROUND

Technical Field

The disclosure relates to transmission schemes in wireless communication systems, and in particular to a method and a device for narrowband communication based on cellular communication.

Related Art

At the 3$^{rd}$ Generation Partner Project (3GPP) Radio Access Network (RAN) #69 plenary session, NarrowBand Internet of Things (NB-IoT) is approved as a construction project. NB-IoT supports three different operating modes (RP-151621) as follows:
1. stand-alone operating mode, deployed on a frequency spectrum used by the GERAN system;
2. guard band operating mode, deployed on unused resource blocks in the guard band of Long Term Evolution (LTE) carriers; and
3. in-band operating mode, deployed on resource blocks of LTE carriers.

Further, in NB-IoT, User Equipment (UE) supports 180 kHz Radio Frequency (RF) bandwidth on both uplink and downlink, that is, one Physical Resource Block (PRB).

3GPP proposals RP-150784 and R1-156010 give an introduction on a downlink control channel and corresponding downlink scheduling and uplink scheduling modes probably adopted by NB-IoT. In the above 3GPP proposals, a scheduling timing of NB-IoT is relatively fixed (similar to traditional LTE systems), for example, for a UE in a basic coverage (that is, in a center of a cell), the downlink control channel schedules a downlink transmission or an uplink transmission in a next M-subframe (corresponding to 6 LTE subframes).

SUMMARY

Time-frequency resources reserved for LTE and NB-IoT Enhanced Physical Downlink Control Channel (N-EPDCCH) cannot be scheduled by N-EPDCCH or NB-IoT Physical Downlink Control Channel (N-PDCCH). In the disclosure, N-PDCCH and N-EPDCCH are respectively a candidate physical layer control channel type in NB-IoT. N-PDCCH and N-EPDCCH respectively correspond to PDCCH and EPDCCH in LTE, a time-frequency resource occupied by the N-PDCCH is configured through a cell common signaling. A time-frequency resource occupied by the N-EPDCCH is configured through a UE specific signaling (for example, RRC dedicate signaling).

The inventor finds through study that, if a relatively fixed scheduling timing is adopted, the UE should know LTE subframes reserved for LTE and N-EPDCCH.

Further, considering that a N-EPDCCH resource may be configured per UE (that is, one UE does not know a LTE subframe occupied by a N-EPDCCH configured for another UE), therefore, how a UE determines a time-frequency resource scheduled by a N-EPDCCH is a problem to be solved.

The disclosure provides a solution in view of the above problem. It should be noted that embodiments in the UE of this disclosure and characteristics in the embodiments may be applied to a base station if no conflict is caused, and vice versa. Further, if no conflict is caused, the embodiments of this disclosure and the characteristics in the embodiments may be combined arbitrarily.

A method in a UE supporting narrowband communication includes the following steps:
Step A: receiving a first signaling;
Step B: searching for a second signaling on M searched resources, the second signaling including scheduling information of a target data, the target data being distributed in G time units in time domain, and the bandwidth occupied by the target data in each time unit being not greater than the bandwidth of one PRB.

If the UE searches out the second signaling in the Step B, the method in the UE supporting narrowband communication further includes the following steps:
Step C: transmitting the target data, the second signaling being an uplink scheduling signaling; or, receiving the target data, the second signaling being a downlink scheduling signaling.

Herein, the first signaling indicates a first time unit set, time units occupied by the M searched resources all belong to the first time unit set, the second signaling is a physical layer signaling, the searched resource is distributed in N time units in time domain, the bandwidth occupied by the searched resource in each time unit is not greater than the bandwidth of one PRB. The duration of the time unit is 1 millisecond, and M, G and N are positive integers respectively.

The bandwidth of one PRB is 180 kHz.

In one embodiment, the first signaling is UE specific, that is, only a specified UE can receive the first signaling.

In one embodiment, the first signaling is a higher layer signaling.

In one embodiment, the first signaling is a dedicated Radio Resource Control (RRC) signaling.

In one embodiment, the time unit in the disclosure is one LTE subframe.

In one embodiment, the start moment of the time unit in the disclosure is not synchronous with the start moment of the LTE subframe.

In one embodiment, the M searched resources occupy 180 kHz bandwidth.

In one embodiment, the target data is transmitted on a 180 kHz bandwidth.

In one embodiment, the target data is transmitted on a bandwidth less than 180 kHz.

In one embodiment, M is equal to 1.

In one embodiment, N is equal to 1.

In one embodiment, M is greater than 1, the UE supposes that the second signaling is repeatedly transmitted for M times on the M searched resources respectively.

In one embodiment, M is greater than 1; for the M searched resources, a Resource Element (RE) pattern occupied by the second signaling in each of the searched resource is the same. This embodiment is particularly suitable for the stand-alone operating mode or the guard band operating mode.

In one embodiment, M is greater than 1; for the M searched resources, a RE pattern occupied by the second signaling in each of the searched resource other than the RE occupied by a public signal is the same, the public signal including at least one of {synchronization sequence, physical broadcast channel, Cell Reference Signal (CRS)}. This embodiment is particularly suitable for the in-band operating mode. As a sub-embodiment, the synchronization sequence includes at least one of {Zadoff-Chu sequence, pseudorandom sequence}. As a further sub-embodiment, the synchronization sequence indicates a physical cell identifier of a serving cell of the UE.

In one embodiment, time units in the first time unit set are sorted in a chronological order, wherein every Q continuous time units correspond to a group of M searched resources, Q is equal to the product of M and N.

In one embodiment, the first signaling further indicates M.

Specifically, according to one aspect of the disclosure, the Step A further includes the following steps:

Step A0: receiving a third signaling.

Herein, the third signaling indicates a second time unit set, the first signaling identifies the first time unit set in the second time unit set, the G time units are behind a given time unit, the given time unit is the with time unit behind the last time unit in the M searched resources, and v is a positive integer.

In the above aspects, the base station can configure for each UE the time unit the physical layer control signaling of NB-IoT probably occupies, thereby reducing the energy loss caused when the UE searches for the physical layer control signaling of NB-IoT as far as possible. In addition, the first signaling further selecting the first time unit set in the second time unit set reduces the overhead of the first signaling, compared with directly indicating the first time unit set.

In one embodiment, the third signaling and the first signaling are higher layer signalings respectively.

In one embodiment, the third signaling is cell specific, that is, UEs having NB-IoT capability all can receive the third signaling.

In one embodiment, the first signaling is a higher layer signaling.

In one embodiment, the first signaling is a common RRC signaling.

In one embodiment, the logic channel bearing the third signaling is a Broadcasting Control Channel (BCCH).

In one embodiment, the transport channel bearing the third signaling is a Downlink Shared Channel (DL-SCH).

In one embodiment, the second time unit set includes all the time units that can be used for N-EPDCCH on a target frequency band, the target frequency band is a frequency band occupied by the target data.

In one embodiment, the second time unit set includes all the time units that can be used for NB-IoT transmission on a target frequency band other than fixed time units, the target frequency band is a frequency band occupied by the target data. The fixed time units are time units used for the transmission of specific information for NB-IoT, and the specific information includes a synchronization sequence.

In one embodiment, v is 1.

In one embodiment, v is 2.

In one embodiment, the G time units are G available time units that are closest to a given time unit. The available time units are time units that can be scheduled by N-PDCCH or N-EPDCCH.

In one embodiment, the third signaling is a common RRC IE.

Specifically, according to one aspect of the disclosure, the Step A further includes the following steps:

Step A1: receiving a fourth signaling, the fourth signaling indicating a third time unit set; or determining that the third time unit set includes all time units other than fixed time units.

Herein, the third time unit set includes all the time units that can be used for NB-IoT transmission on a target frequency band other than fixed time units, the target frequency band is a frequency band occupied by the target data. The fixed time units are time units used for the transmission of specific information for NB-IoT, and the specific information includes a synchronization sequence.

On the target frequency band, information transmitted in the fixed time unit is of fixed type, and the location of the fixed time unit is fixed too, that is, the fixed time unit cannot be scheduled by N-PDCCH or N-EPDCCH.

In one embodiment, the third time unit set is composed of all the time units that can be scheduled by N-PDCCH or N-EPDCCH on a target frequency band, the second time unit set includes all the time units that can be used for N-EPDCCH on the target frequency, and the target frequency band is a frequency band occupied by the target data.

In one embodiment, the fourth signaling is a higher layer signaling. In one embodiment, the logic channel bearing the fourth signaling is a BCCH.

In one embodiment, the transport channel bearing the fourth signaling is a DL-SCH.

In one embodiment, the third signaling identifies the second time unit set in the third time unit set.

In one embodiment, the specific information includes at least one of {physical broadcast information, system information}.

In one embodiment, the synchronization sequence includes at least one of {Zadoff-Chu sequence, pseudorandom sequence}.

Specifically, according to one aspect of the disclosure, the scheduling information identifies the G time units in a target time unit set, time units in the second time unit set belong to the third time unit set, the target time unit set is composed of all the time units in the third time unit set but outside the second time unit set.

The essence of the above aspect is that the configuration information in the second signaling of the base station is to perform resource scheduling on the time unit in the target time unit set only, thereby reducing the payload size of the second signaling.

In one embodiment, the G time units are continuous in the target time unit set. This embodiment is to reduce the air interface resource occupied by the second signaling as far as possible.

In one embodiment, the scheduling information further includes at least one of {Modulation and Coding Status (MCS), Redundancy Version (RV), New Data Indicator (NDI)}.

Specifically, according to one aspect of the disclosure, the scheduling information identifies the G time units in a target time unit set, time units in the first time unit set belong to the third time unit set, the target time unit set is composed of all the time units in the third time unit set but outside the first time unit set.

The essence of the above aspect is that all UEs searching for N-EPDCCH on the target frequency band carries out search in the same time unit.

In one embodiment of the above aspect, the first signaling is a common RRC signaling.

In one embodiment of the above aspect, the logic channel bearing the first signaling is a BCCH.

In one embodiment of the above aspect, the transport channel bearing the first signaling is a DL-SCH.

Specifically, according to one aspect of the disclosure, the third signaling identifies J time unit groups that appear periodically in the third time unit set, the time unit group is composed of a positive integer number of time units, and J is a positive integer.

In one embodiment, any two of the J time unit groups that appear periodically include different numbers of time units.

In one embodiment, the second time unit set is composed of all the time units in the J time unit groups that appear periodically, which are sorted in a chronological order, In one embodiment, in the J time unit groups that appear periodically, different time unit groups probably include the same time unit.

In one embodiment, the first time unit set is one of the J time unit groups that appear periodically.

In one embodiment, the M searched resources appear once one time unit group that appears periodically appears.

In one embodiment, time units occupied by one time unit group that appears periodically when appearing for one time are continuous in the third time unit set.

Specifically, according to one aspect of the disclosure, the first signaling identifies one time unit group that appears periodically in the third time unit set, and the time unit group is composed of a positive integer number of time units.

In one embodiment of the above aspect, the M searched resources correspond to one appearance of the time unit group.

In one embodiment of the above aspect, the first signaling is a common RRC signaling.

In one embodiment of the above aspect, the logic channel bearing the first signaling is a BCCH.

In one embodiment of the above aspect, the transport channel bearing the first signaling is a DL-SCH.

Specifically, according to one aspect of the disclosure, the Step A further includes the following steps:

Step A2: transmitting a fifth signaling, the fifth signaling requesting to adjust the first time unit set. The adjusting is one of {adding time unit, reducing time unit, maintaining}.

In the above aspects, the base station can set a proper first time unit set for the UE through the fifth signaling. Too many time units in the first time unit set could cause too much Blind Decoding (BD) carried out by the UE, thereby increasing energy loss; too few time units in the first time unit set could cause delayed transmitting of the uplink data of the UE, thereby resulting in packet loss.

In one embodiment, the fifth signaling is an upper layer signaling.

In one embodiment, the fifth signaling is a physical layer signaling.

In one embodiment, the second signaling is an uplink scheduling signaling.

In one embodiment, in the Step A2 the UE determines the adjusting according to the current status of the data cache.

Specifically, according to one aspect of the disclosure, the resource occupied by the second signaling in each of the searched resources is one of K candidate resources. The candidate resource is composed of a positive integer number of RE sets, and the RE set includes a positive integer number of REs. The number of RE sets in the N time units is greater than or equal to L, the number of RE sets in the (N−1) time units former in the time in the N time units is less than L. L is the number of RE sets included in a given candidate resource, the given candidate resource being one candidate resource which includes the maximum number of RE sets in the K candidate resources. K and L are positive integers respectively.

In one embodiment, K candidate resources at least include two candidate resources, and the two candidate resources include different numbers of RE sets.

In one embodiment, the candidate resource at least includes two RE sets, and the RE sets include different numbers of REs.

The disclosure discloses a method in a base station supporting narrowband communication, which includes the following steps:

Step A: transmitting a first signaling.

Step B: transmitting a second signaling on each of M searched resources respectively, the second signaling including scheduling information of a target data, the target data being distributed in G time units in time domain, and the bandwidth occupied by the target data in each time unit being not greater than the bandwidth of one PRB.

Step C: receiving the target data, the second signaling being an uplink scheduling signaling; or, transmitting the target data, the second signaling being a downlink scheduling signaling.

Herein, the first signaling indicates a first time unit set, time units occupied by the M searched resources all belong to the first time unit set, the second signaling is a physical layer signaling, the searched resource is distributed in N time units in time domain, the bandwidth occupied by the searched resource in each time unit is not greater than the bandwidth of one PRB. The duration of the time unit is 1 millisecond. M, G and N are positive integers respectively.

Specifically, according to one aspect of the disclosure, the Step A further includes the following steps:

Step A0: transmitting a third signaling.

Herein, the third signaling indicates a second time unit set, the first signaling identifies the first time unit set in the second time unit set, the G time units are behind a given time unit, the given time unit is the with time unit behind the last time unit in the M searched resources, and v is a positive integer.

Specifically, according to one aspect of the disclosure, the Step A further includes the following steps:

Step A1: transmitting a fourth signaling, the fourth signaling indicating a third time unit set; or determining that the third time unit set includes all time units other than fixed time units.

Herein, the third time unit set includes all the time units that can be used for NB-IoT transmission on a target frequency band other than fixed time units, the target frequency band is a frequency band occupied by the target data. The fixed time units are time units used for the transmission of specific information for NB-IoT, and the specific information includes a synchronization sequence.

According to one aspect of the disclosure, the scheduling information identifies the G time units in a target time unit set, time units in the second time unit set belong to the third time unit set, the target time unit set is composed of all the time units in the third time unit set but outside the second time unit set.

According to one aspect of the disclosure, the scheduling information identifies the G time units in a target time unit set, time units in the first time unit set belong to the third time unit set, the target time unit set is composed of all the time units in the third time unit set but outside the first time unit set.

According to one aspect of the disclosure, the third signaling identifies J time unit groups that appear periodically in the third time unit set, the time unit group is composed of a positive integer number of time units, and J is a positive integer.

According to one aspect of the disclosure, the first signaling identifies in the third time unit set one time unit group that appears periodically, the time unit group is composed of a positive integer number of time units.

According to one aspect of the disclosure, the Step A further includes the following steps:
   Step A2: transmitting a fifth signaling, the fifth signaling requesting to adjust the first time unit set. The adjusting is one of {adding time unit, reducing time unit, maintaining}.

In one embodiment, the base station determines the adjusting according to the fifth signaling.

According to one aspect of the disclosure, the resource occupied by the second signaling in each of the searched resources is one of K candidate resources. The candidate resource is composed of a positive integer number of RE sets, and the RE set includes a positive integer number of REs. The number of RE sets in the N time units is greater than or equal to L, the number of RE sets in the (N−1) time units former in the time in the N time units is less than L. L is the number of RE sets included in a given candidate resource, the given candidate resource being one candidate resource which includes the maximum number of RE sets in the K candidate resources. K and L are positive integers respectively.

In the above aspect, the searched resources of the UE are minimized, so as to reduce the number of times of blind decoding, meanwhile to reduce power loss and hardware cost.

The disclosure discloses a UE supporting narrowband communication, which includes the following modules:
   a first module, which is configured to receive a first signaling;
   a second module, which is configured to search for a second signaling on M searched resources, the second signaling including scheduling information of a target data, the target data being distributed in G time units in time domain, and the bandwidth occupied by the target data in each time unit being not greater than the bandwidth of one PRB.

If the second signaling is searched out, the UE further includes:
   a third module, which is configured to transmit the target data, the second signaling being an uplink scheduling signaling, or is configured to receive the target data, the second signaling being a downlink scheduling signaling;

Herein, the first signaling indicates a first time unit set, time units occupied by the M searched resources all belong to the first time unit set, the second signaling is a physical layer signaling, the searched resource is distributed in N time units in time domain, the bandwidth occupied by the searched resource in each time unit is not greater than the bandwidth of one PRB. The duration of the time unit is 1 millisecond. M, G, N are positive integers respectively.

In one embodiment, in the UE supporting narrowband communication, the first module is further configured to receive a third signaling. Herein, the third signaling indicates a second time unit set, the first signaling identifies the first time unit set in the second time unit set, the G time units are behind a given time unit, the given time unit is the with time unit behind the last time unit in the M searched resources, and v is a positive integer.

In one embodiment, in the UE supporting narrowband communication, the scheduling information identifies the G time units in a target time unit set, time units in the second time unit set belong to the third time unit set, the target time unit set is composed of all the time units in the third time unit set but outside the second time unit set.

In one embodiment, in the UE supporting narrowband communication, the resource occupied by the second signaling in each of the searched resources is one of K candidate resources. The candidate resource is composed of a positive integer number of RE sets, and the RE set includes a positive integer number of REs. The number of RE sets in the N time units is greater than or equal to L, the number of RE sets in the (N−1) time units former in the time in the N time units is less than L. L is the number of RE sets included in a given candidate resource, the given candidate resource being one candidate resource which includes the maximum number of RE sets in the K candidate resources. K and L are positive integers respectively.

The disclosure discloses a base station apparatus supporting narrowband communication, which includes the following modules:
   a first module, which is configured to transmit a first signaling;
   a second module, which is configured to transmit a second signaling on each of M searched resources respectively, the second signaling including scheduling information of a target data, the target data being distributed in G time units in time domain, and the bandwidth occupied by the target data in each time unit being not greater than the bandwidth of one PRB; and
   a third module, which is configured to receive the target data, the second signaling being an uplink scheduling signaling, or is configured to transmit the target data, the second signaling being a downlink scheduling signaling.

Herein, the first signaling indicates a first time unit set, time units occupied by the M searched resources all belong to the first time unit set, the second signaling is a physical layer signaling, the searched resource is distributed in N time units in time domain, the bandwidth occupied by the searched resource in each time unit is not greater than the bandwidth of one PRB. The duration of the time unit is 1 millisecond. M, G, N are positive integers respectively.

In one embodiment, in the base station apparatus supporting narrowband communication, the first module is further configured to transmit a third signaling. Herein, the third signaling indicates a second time unit set, the first signaling identifies the first time unit set in the second time unit set, the G time units are behind a given time unit, the given time unit is the with time unit behind the last time unit in the M searched resources, and v is a positive integer.

In one embodiment, in the base station apparatus supporting narrowband communication, the scheduling information identifies the G time units in a target time unit set, time units in the second time unit set belong to the third time unit set, the target time unit set is composed of all the time units in the third time unit set but outside the second time unit set.

In one embodiment, in the base station apparatus supporting narrowband communication, the resource occupied by the second signaling in each of the searched resources is one of K candidate resources. The candidate resource is composed of a positive integer number of RE sets, and the RE set includes a positive integer number of REs. The number of RE sets in the N time units is greater than or equal to L, the number of RE sets in the (N−1) time units former in the time in the N time units is less than L. L is the number of RE sets included in a given candidate resource, the given candidate resource being one candidate resource which includes the maximum number of RE sets in the K candidate resources. K and L are positive integers respectively.

Compared with existing public technologies, the disclosure has technical advantages as follows:
1. reducing the energy loss caused by the blind decoding of the physical layer control signaling of NB-IoT;
2. flexibly scheduling the time units used for NB-IoT in time domain, being suitable for different Transport Block Sizes (TBSs); and
3. reducing the payload size of the control signaling used for scheduling time units, and improving transmission efficiency.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is caused.

Embodiment 1

Figure 1:
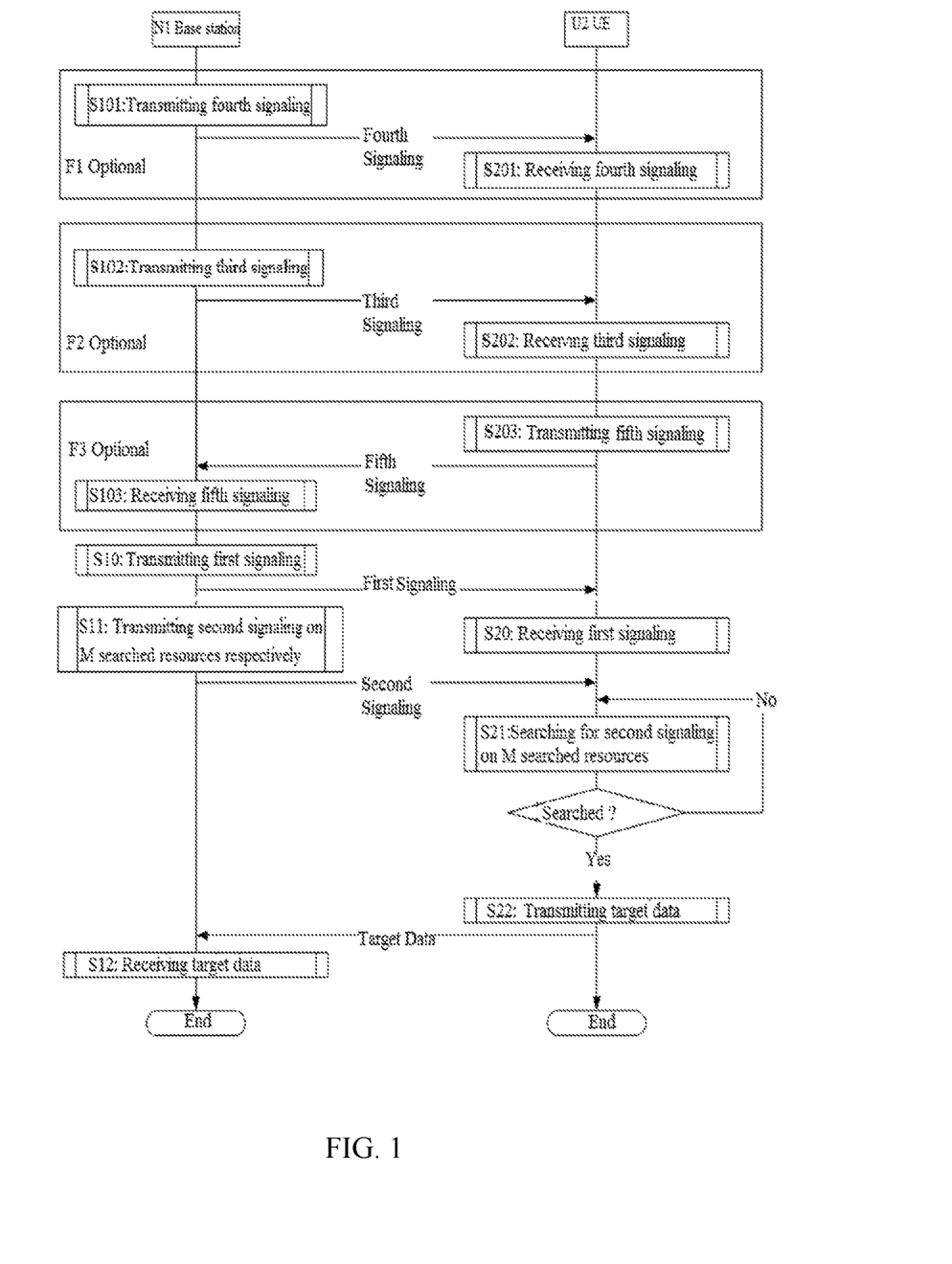
FIG. 1 is a flowchart illustrating uplink data transmission according to one embodiment of the disclosure.

Embodiment 1 gives an example of a flowchart illustrating uplink data transmission, as shown in FIG. 1. In FIG. 1, the base station N1 is the maintenance base station of the serving cell of the UE U2, steps identified in boxes F1, F2 and F3 are optional steps.

The base station N1 transmits a first signaling in S10, transmits a second signaling on each of M searched resources respectively in S11 and receives a target data in S12.

The UE U2 receives the first signaling in S20 and searches for the second signaling on M searched resources in a current group in S21. If the second signaling is searched out, the UE U2 transmits the target data in S22; if the second signaling is not searched, the UE U2 continues searching for the second signaling on a next group of M searched resources.

In embodiment 1, the first signaling indicates a first time unit set, time units occupied by the M searched resources all belong to the first time unit set, the second signaling includes scheduling information of the target data, the target data is distributed in G time units in time domain, and the bandwidth occupied by the target data in each time unit is not greater than the bandwidth of one PRB. The second signaling is a physical layer signaling, the searched resource is distributed in N time units in time domain, the bandwidth occupied by the searched resource in each time unit is not greater than the bandwidth of one PRB. The duration of the time unit is 1 millisecond, and M, G and N are positive integers respectively. The M searched resources appear many times in time domain, the UE U2 is not sure on which group of M searched resources the base station N1 transmits the second signaling, therefore, the UE U2 searches for the second signaling on each group of M searched resources (appearing each time). The second signaling is an uplink scheduling signaling (that is, a physical layer signaling used for scheduling uplink data transmission).

In another embodiment of Embodiment 1, the UE U2 performs Maximum Ratio Combining (MRC) on M groups of radio signals to obtain a group of combining signals in S21, the M groups of radio signals being received on M searched resources respectively. The UE U2 performs decoding on the combining signal to determine whether it is the second signaling in S21.

In another embodiment of Embodiment 1, the frequency band occupied by the M searched resources is located in the LTE frequency band, the base station N1 transmits a fourth signaling in S101, and the UE U2 receives the fourth signaling in S201. Wherein the fourth signaling indicates a third time unit set, the third time unit set includes all the time units that can be used for NB-IoT transmission on a target frequency band other than fixed time units, and the target frequency band is a frequency band not greater than 180 kHz occupied by the target data. The fixed time units are time units used for the transmission of specific information for NB-IoT, and the specific information includes at least one of {synchronization sequence, physical broadcast information, system information}, the physical broadcast information is transmitted on a physical broadcast channel, the logic channel bearing the system information is a BCCH, the transport channel bearing the system information is a DL-SCH, and the synchronization sequence includes a primary synchronization sequence and a secondary synchronization sequence.

In another embodiment of Embodiment 1, the frequency band corresponding to the M searched resources is located outside the LTE frequency band (that is, the standalone mode), the base station N1 and UE U2 respectively determine that the third time unit set includes all time units other than fixed time units. Herein, the third time unit set includes all the time units that can be used for NB-IoT transmission on the above target frequency band other than the above fixed time units.

In another embodiment of Embodiment 1, the base station N1 transmits a third signaling in S102, and the UE U2 receives the third signaling in S202. Herein, the third signaling indicates a second time unit set, the first signaling identifies the first time unit set in the second time unit set, the second time unit set and the first time unit set respectively are composed of a positive integer number of time units. The G time units are behind a given time unit, the given time unit is the with time unit behind the last time unit in the M searched resources, and v is a positive integer.

In another embodiment of Embodiment 1, the UE U2 transmits a fifth signaling in S203, and the base station N1 receives the fifth signaling in S103. The fifth signaling requests to adjust the first time unit set. The adjusting is one of {adding time unit, reducing time unit, maintaining}.

In another embodiment of Embodiment 1, G is a positive integer multiple of 6, and the corresponding sub-carrier interval is 2.5 kHz.

Embodiment 2

Figure 2:
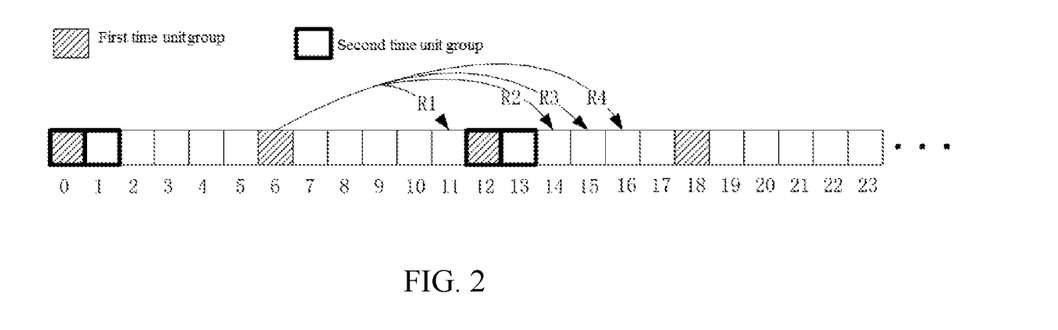
FIG. 2 is a diagram illustrating a plurality of time unit groups having overlap according to one embodiment of the disclosure.

Embodiment 2 gives an example of a diagram illustrating a plurality of time unit groups having overlap, as shown in FIG. 2. In FIG. 2, time units {0, 1, 2, . . . , 23, . . . } are sorted in a chronological order and form a third time unit set. Squares marked by oblique lines indicate time units in the first time unit group, and squares marked by bold line frames indicate time units in the second time unit group.

The third signaling identifies J time unit groups that appear periodically in the third time unit set—the first time unit group and the second time unit group, the J is 2. The second time unit set is composed of the time units in the J time unit groups that appear periodically, which are cascaded in a chronological order, that is, including time units {0, 1, 6, 12, 13, 18, . . . }. The first time unit group is overlapped with a time unit in the second time unit group, for example, time units {0, 12, . . . }.

In another embodiment of Embodiment 2, the first time unit set is one of the J time unit groups that appear periodically, that is, the first time unit group. The first time unit set includes time units {0, 6, 12, 18, . . . }.

In another embodiment of Embodiment 2, the first time unit set includes part time units included in one time unit group that appears periodically and the time units in the first time unit set are equally spaced in the third time unit set. The first time unit set includes time units {0, 12, . . . }.

In another embodiment 3 of Embodiment 2, the M searched resources appear once the second time unit group appears, that is, the M searched resources correspond to one group of {time unit group {0, 1}, time unit group {12, 13}, . . . }, the product of M and N is 2.

In another embodiment of Embodiment 2, time units occupied by one time unit group that appears periodically when appearing for one time are continuous in the third time unit set.

In another embodiment of Embodiment 2, M and N both are 1 in the disclosure, that is, the second signaling is sent in one time unit. The scheduling information in the second signaling identifies the G time units in a target time unit set, time units in the second time unit set belong to the third time unit set, the target time unit set is composed of all the time units in the third time unit set but outside the second time unit set, that is, time units {2, 3, 4, 5, 7, 8, 9, 10, 11, 14, 15, 16, 17, 19, 20, 21, 22, 23, . . . }. The G time units are continuous in the target time unit set, that is, the G time units are time units {11, 14, 15, 16} respectively, the scheduling time sequence of the second signaling is as indicated by arrows {R1, R2, R3, R4}.

Embodiment 3

Figure 3:
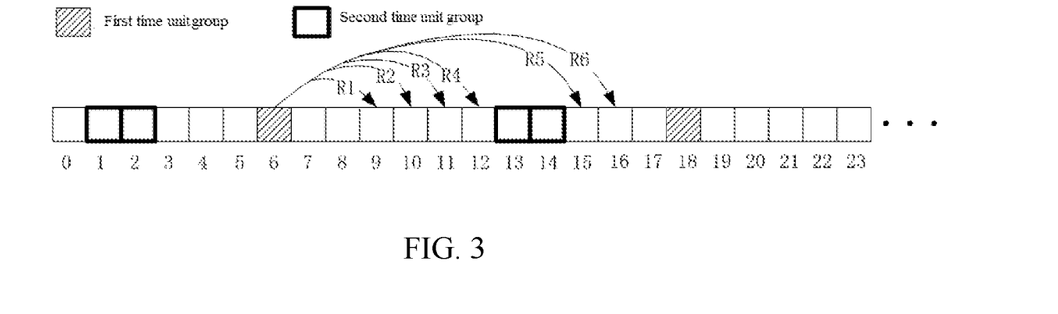
FIG. 3 is a diagram illustrating a plurality of time unit groups having no overlap according to one embodiment of the disclosure.

Embodiment 3 gives an example of a diagram illustrating a plurality of time unit groups having no overlap, as shown in FIG. 3. In FIG. 3, time units {0, 1, 2, . . . , 23, . . . } are sorted in a chronological order and form a third time unit set. Squares marked by oblique lines indicate time units in the first time unit group, and squares marked by bold line frames indicate time units in the second time unit group.

The third signaling identifies J time unit groups that appear periodically in the third time unit set—the first time unit group and the second time unit group, the J is 2. The second time unit set is composed of the time units in the J time unit groups that appear periodically, which are cascaded in a chronological order, that is, including time units {1, 2, 6, 13, 14, 18 . . . }. The first time unit group is not overlapped with the time unit in the second time unit group, the first time unit group includes time units {6, 18, . . . }, the second time unit group includes time units {1, 2, 13, 14, . . . }.

In another embodiment of Embodiment 3, M and N both are 1 in the disclosure, that is, the second signaling is sent in one time unit. The scheduling information in the second signaling identifies the G time units in a target time unit set, time units in the second time unit set belong to the third time unit set, the target time unit set is composed of all the time units in the third time unit set but outside the second time unit set, that is, time units {0, 3, 4, 5, 7, 8, 9, 10, 11, 12, 15, 16, 17, 19, 20, 21, 22, 23, . . . }. The G time units are continuous in the target time unit set, that is, the G time units are time units {9, 10, 11, 12, 15, 16} respectively, the scheduling time sequence of the second signaling is as indicated by arrows {R1, R2, R3, R4, R5, R6}.

In another embodiment of Embodiment 3, the G time units are continuous in the target time unit set, the scheduling information of the second signaling indicates the start time unit of the G time units and the G.

Embodiment 4

Figure 4:
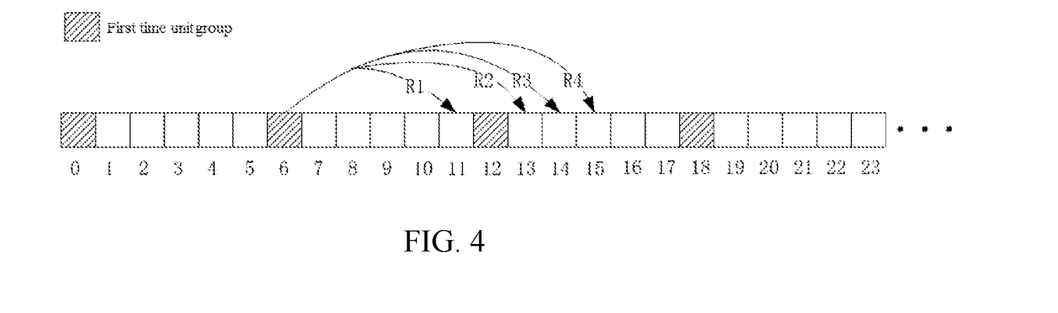
FIG. 4 is a diagram illustrating one time unit group according to one embodiment of the disclosure.

Embodiment 4 gives an example of a diagram illustrating one time unit group, as shown in FIG. 4. In FIG. 4, time units {0, 1, 2, . . . , 23, . . . } are sorted in a chronological order and form a third time unit set. Squares marked by oblique lines indicate time units in the first time unit group.

In Embodiment 4, the first signaling identifies in the third time unit set one time unit group that appears periodically, that is, the first time unit group. The first time unit set is composed of the time units in the one time unit group that appears periodically, which are cascaded in a chronological order, that is, including time units {0, 6, 12, 18, . . . }.

In Embodiment 4, there is no third signaling in the disclosure, the UE determines the time units occupied by N-EPDCCH according to the fourth signaling and the first signaling, thereby determining the time units that can be scheduled by N-EPDCCH.

In another embodiment of Embodiment 4, M and N both are 1 in the disclosure, that is, the second signaling is sent in one time unit. The scheduling information in the second signaling identifies the G time units in a target time unit set, time units in the first time unit set belong to the third time unit set. The target time unit set is composed of all the time units in the third time unit set but outside the first time unit set, that is, time units {1, 2, 3, 4, 5, 7, 8, 9, 10, 11, 13, 14, 15, 16, 17, 19, 20, 21, 22, 23, . . . }. The G time units are continuous in the target time unit set, that is, the G time units are time units {11, 13, 14, 15} respectively, the scheduling time sequence of the second signaling is as indicated by arrows {R1, R2, R3, R4}.

In another embodiment of Embodiment 4, the first signaling is a common RRC signaling.

Embodiment 5

Figure 5:
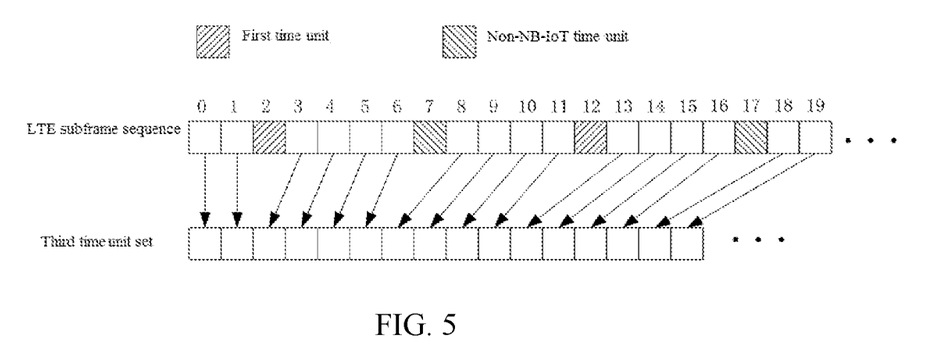
FIG. 5 is a diagram illustrating a third time unit set according to one embodiment of the disclosure.

Embodiment 5 gives an example of a diagram illustrating a third time unit set, as shown in FIG. 5. In FIG. 5, LTE subframes marked by oblique lines indicate the fixed time units in the disclosure, and LTE subframes marked by backlashes are reserved for the non-NB-IoT transmission units (which cannot be used for NB-IoT transmission) of LTE.

The fourth signaling indicates the third time unit set; except the LTE subframes reserved for the non-NB-IoT transmission units of LTE and the fixed time units, all other LTE subframes belong to the third time unit set.

Embodiment 6

Figure 6:
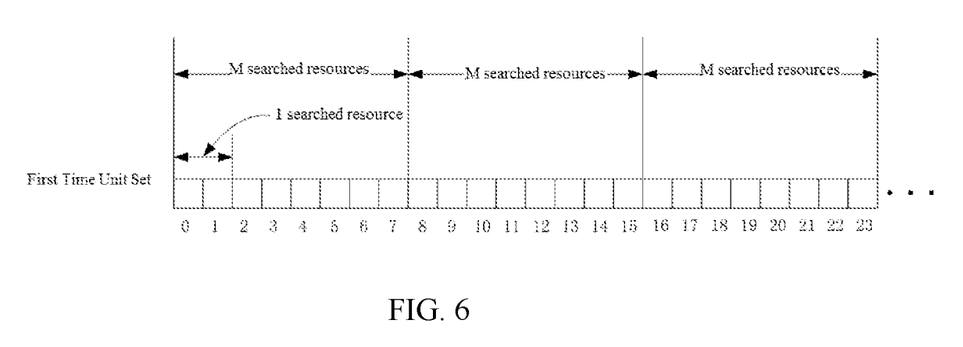
FIG. 6 is a diagram illustrating a first time unit set according to one embodiment of the disclosure.

Embodiment 6 gives an example of a diagram illustrating a first time unit set, as shown in FIG. 6.

In Embodiment 6, the first time unit set is composed of the time units occupied by M searched resources that are sent cyclically.

In Embodiment 6, the M is 4 in the disclosure, one searched resource occupies 2 time units, that is, N is 2. The time units occupied by one searched resource are continuous in the first time unit set, and the time units occupied by the M searched resources when appearing for one time are continuous in the first time unit set.

Embodiment 7

Figure 7:
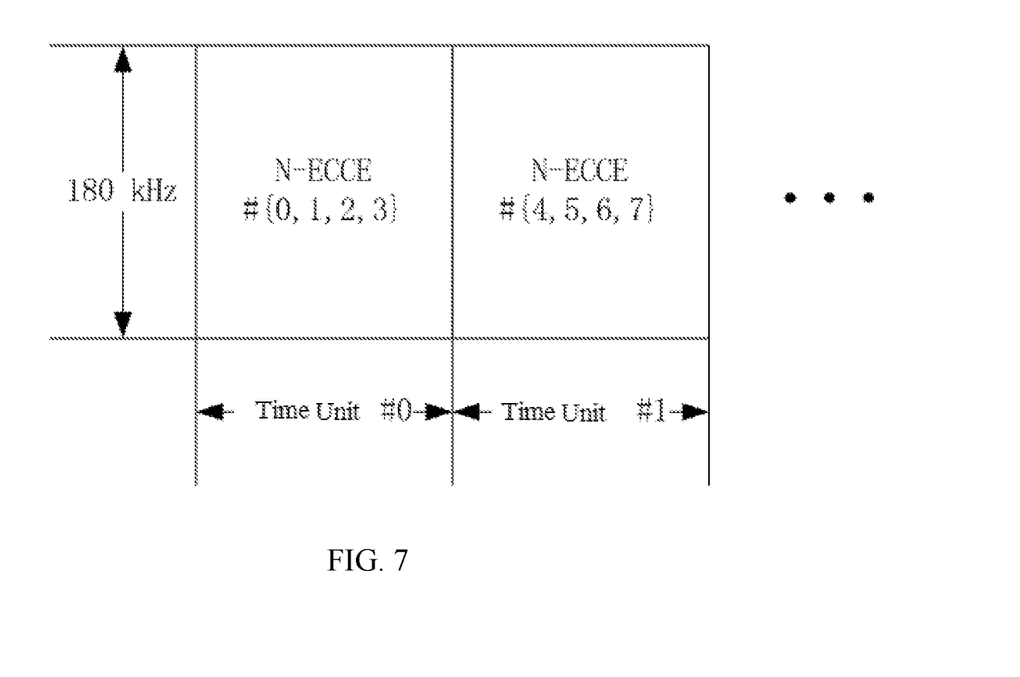
FIG. 7 is a diagram illustrating performing blind decoding on a second signaling according to one embodiment of the disclosure.

Embodiment 7 gives an example of a diagram illustrating performing blind decoding on a second signaling, as shown in FIG. 7. In FIG. 7, all REs of one time unit on 180 kHz are divided into 4 NB-IoT Enhanced Control Channel Elements (N-ECCEs), the N-ECCE is the component unit of an N-EPDCCH, and an N-EPDCCH is composed of one or more N-ECCEs.

In Embodiment 7, the resource occupied by the second signaling in each of the searched resources is one of K candidate resources. The candidate resource is composed of a positive integer number of RE sets, and the RE set includes a positive integer number of REs. The number of RE sets in the N time units occupied by the searched resource is greater than or equal to L, the number of RE sets in the (N−1) time units former in the time in the N time units is less than L. L is the number of RE sets included in a given candidate resource, the given candidate resource being one candidate resource which includes the maximum number of RE sets in the K candidate resources. K and L are positive integers respectively. The RE set is the N-ECCE.

In another embodiment of Embodiment 7, N is 1, K is 7, L is 4, the K candidate resources are:
the first candidate resource: N-ECCE {0}
the second candidate resource: N-ECCE {1}
the third candidate resource: N-ECCE {2}
the fourth candidate resource: N-ECCE {3}
the fifth candidate resource: N-ECCE {0, 1}
the sixth candidate resource: N-ECCE {2, 3}
the seventh candidate resource: N-ECCE {0, 1, 2, 3}.

In another embodiment of Embodiment 7, N is 2, K is 8, L is 8, the K candidate resources are:
the first candidate resource: N-ECCE {0}
the second candidate resource: N-ECCE {1}
the third candidate resource: N-ECCE {2}
the fourth candidate resource: N-ECCE {3}
the fifth candidate resource: N-ECCE {0, 1}
the sixth candidate resource: N-ECCE {2, 3}
the seventh candidate resource: N-ECCE {0, 1, 2, 3}
the eighth candidate resource: N-ECCE {0, 1, 2, 3, 4, 5, 6, 7}.

Embodiment 8

Figure 8:
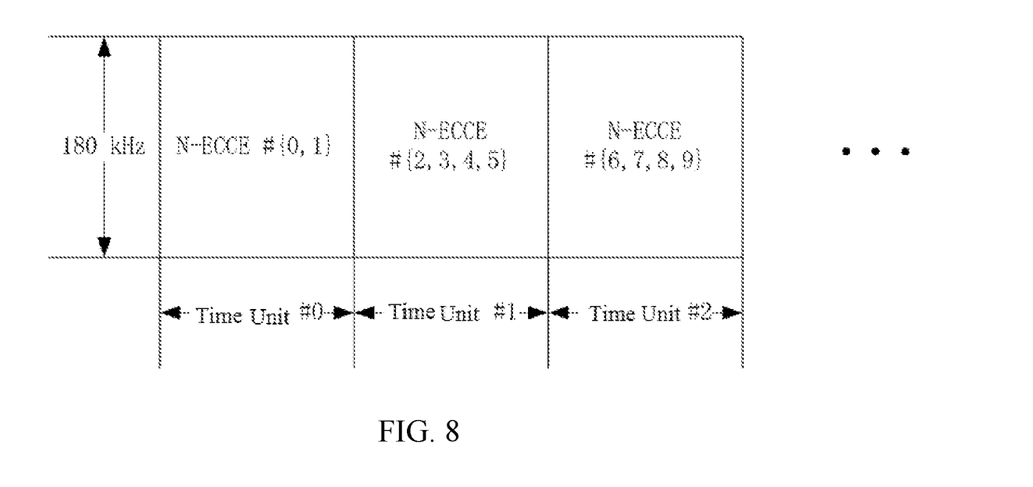
FIG. 8 is a diagram illustrating performing blind decoding on a second signaling according to another embodiment of the disclosure.

Embodiment 8 gives an example of a diagram illustrating performing blind decoding on a second signaling, as shown in FIG. 8. In FIG. 8, all REs of one time unit on 180 kHz are divided into 4 N-ECCEs or 2 N-ECCEs, the N-ECCE is the component unit of an N-EPDCCH, and an N-EPDCCH is composed of one or more N-ECCEs.

In Embodiment 8, the resource occupied by the second signaling in each of the searched resources is one of K candidate resources. The candidate resource is composed of a positive integer number of RE sets, and the RE set includes a positive integer number of REs. The number of RE sets in the N time units occupied by the searched resource is greater than or equal to L, the number of RE sets in the (N−1) time units former in the time in the N time units is less than L. L is the number of RE sets included in a given candidate resource, the given candidate resource being one candidate resource which includes the maximum number of RE sets in the K candidate resources. K and L are positive integers respectively. The RE set is the N-ECCE.

In another embodiment of Embodiment 8, N is 2, K is 7, L is 4, the K candidate resources are:
the first candidate resource: N-ECCE {0}
the second candidate resource: N-ECCE {1}
the third candidate resource: N-ECCE {2}
the fourth candidate resource: N-ECCE {3}
the fifth candidate resource: N-ECCE {0, 1}
the sixth candidate resource: N-ECCE {2, 3}
the seventh candidate resource: N-ECCE {0, 1, 2, 3}.

As a sub-embodiment 2 of Embodiment 8, N is 3, K is 8, L is 8, the K candidate resources are:
the first candidate resource: N-ECCE {0}
the second candidate resource: N-ECCE {1}
the third candidate resource: N-ECCE {2}
the fourth candidate resource: N-ECCE {3}
the fifth candidate resource: N-ECCE {0, 1}
the sixth candidate resource: N-ECCE {2, 3}
the seventh candidate resource: N-ECCE {0, 1, 2, 3}
the eighth candidate resource: N-ECCE {0, 1, 2, 3, 4, 5, 6, 7}.

Embodiment 9

Figure 9:
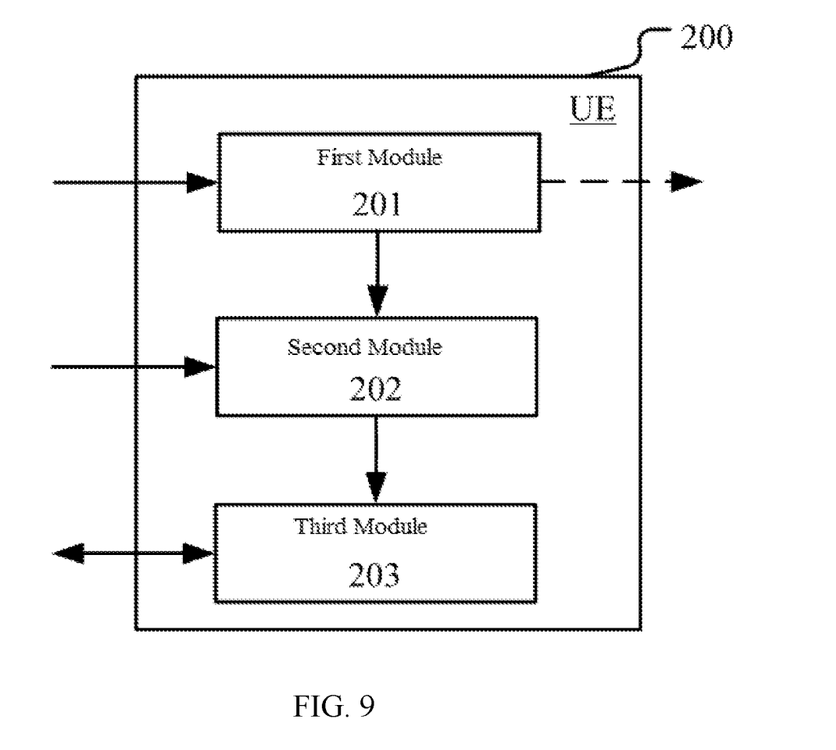
FIG. 9 is a structure diagram illustrating a processing device in a UE according to one embodiment of the disclosure.

Embodiment 9 gives an example of a structure diagram illustrating a processing device in a UE, as shown in FIG. 9. In FIG. 9, a UE processing device 200 mainly is composed of a first module 201, a second module 202 and a third module 203.

The first module 201 is configured to receive a first signaling. The second module 202 is configured to search for a second signaling on M searched resources, the second signaling including scheduling information of a target data, the target data being distributed in G time units in time domain, and the bandwidth occupied by the target data in each time unit being not greater than the bandwidth of one PRB.

If the second signaling is searched out, the UE processing device 200 further includes:

the third module 203 is configured to transmit the target data, the second signaling being an uplink scheduling signaling, or is configured to receive the target data, the second signaling being a downlink scheduling signaling.

In Embodiment 9, the first signaling indicates a first time unit set, time units occupied by the M searched resources all belong to the first time unit set, the second signaling is a physical layer signaling, the searched resource is distributed in N time units in time domain, the bandwidth occupied by the searched resource in each time unit is not greater than the bandwidth of one PRB. The duration of the time unit is 1 millisecond. M, G and N are positive integers respectively. The first signaling is a higher layer signaling.

In another embodiment of Embodiment 9, the first module 201 is further configured to receive a third signaling and a fourth signaling. Herein, the third signaling identifies a second time unit set in a third time unit set, the first signaling identifies the first time unit set in the second time unit set, the G time units are behind a given time unit, the given time unit is the with time unit behind the last time unit in the M searched resources, and v is a positive integer. The fourth signaling indicates the third time unit set. The third time unit set includes all the time units that can be used for NB-IoT transmission on a target frequency band other than fixed time units, the target frequency band is a frequency band occupied by the target data. The fixed time units are time units used for the transmission of specific information for NB-IoT, and the specific information includes a synchronization sequence.

In another embodiment of Embodiment 9, the first module 201 is further configured to transmit a fifth signaling, the fifth signaling requesting to adjust the first time unit set. The adjusting is one of {adding time unit, reducing time unit, maintaining}. The fifth signaling is a physical layer signaling.

Figure 12:
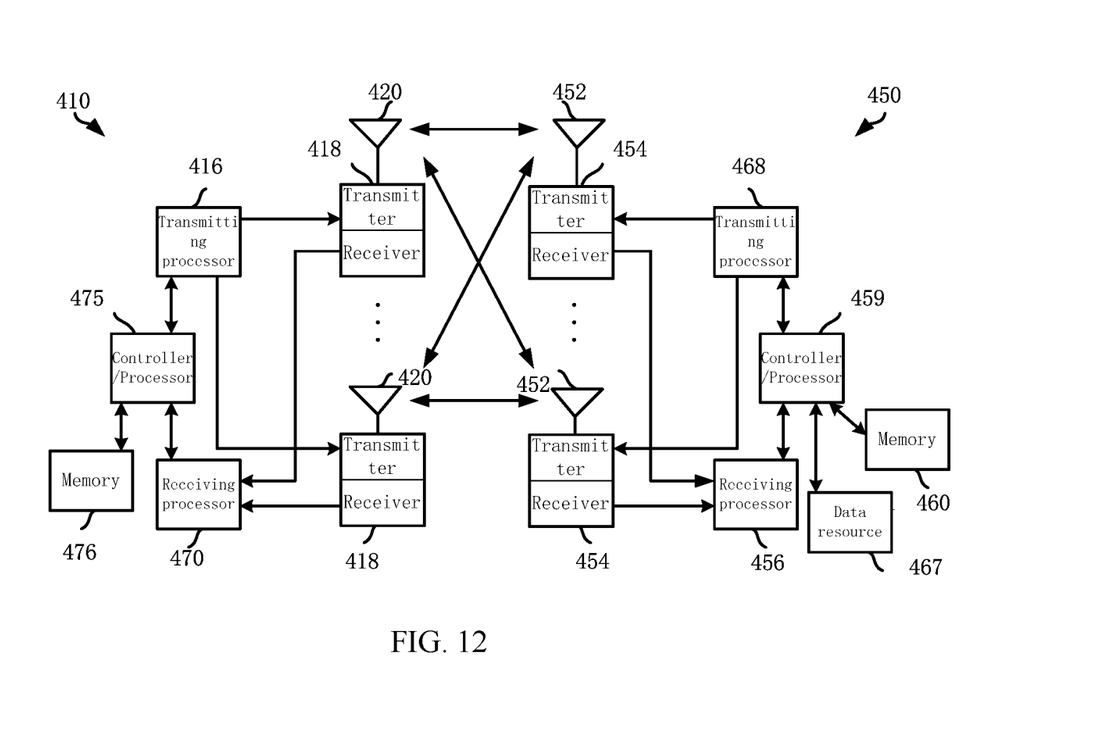
FIG. 12 is a structure diagram illustrating a architecture of a UE and a architecture of a base station in the access network.

In another embodiment of Embodiment 9, the first module 201 includes a controller/processor 459 in embodiment 12.

In another embodiment of Embodiment 9, the first module 201 includes a receiving processor 456 in embodiment 12, a receiver 454 in embodiment 12, and an antenna 452 in embodiment 12.

In another embodiment of Embodiment 9, the second module 202 includes a receiving processor 456 in embodiment 12, a receiver 454 in embodiment 12, and an antenna 452 in embodiment 12.

In another embodiment of Embodiment 9, the third module 202 includes a transmitting processor 468 in embodiment 12, a transmitter 454 in embodiment 12, and an antenna 452 in embodiment 12.

Embodiment 10

Figure 10:
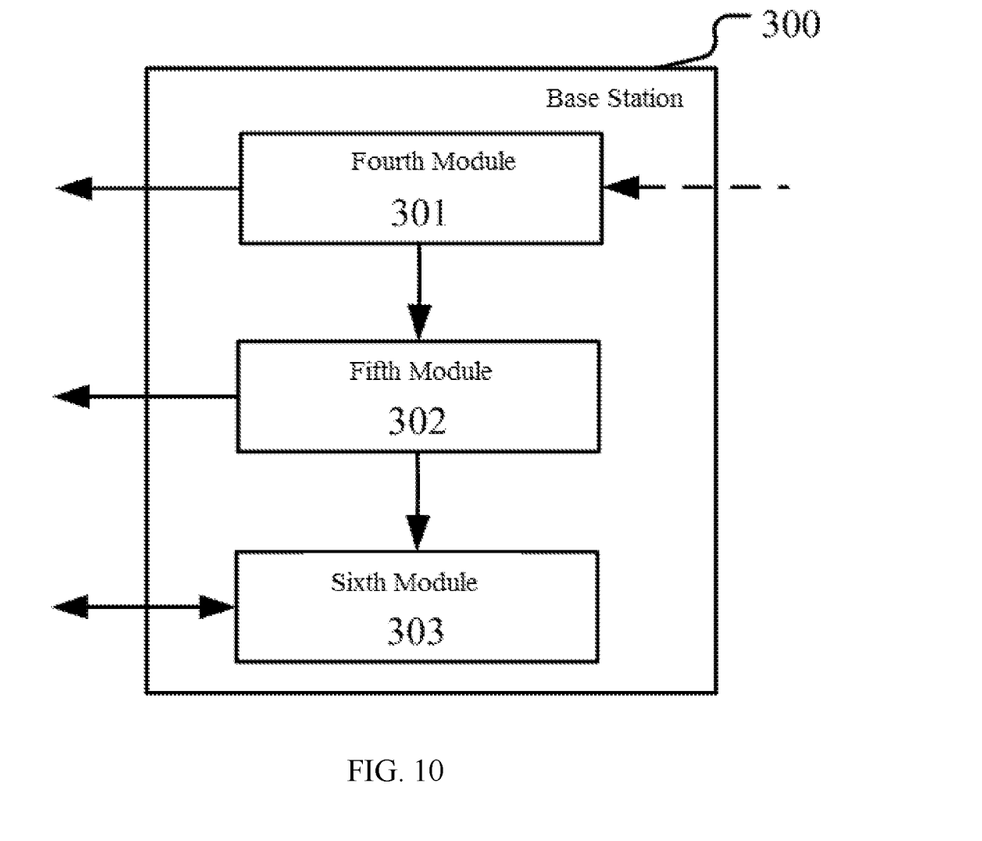
FIG. 10 is a structure diagram illustrating a processing device in a base station according to one embodiment of the disclosure.

Embodiment 10 gives an example of a structure diagram illustrating a processing device in a base station, as shown in FIG. 10. In FIG. 10, the base station processing device 300 is mainly composed of a fourth module 301, a fifth module 302 and a sixth module 303.

The fourth module 301 is configured to transmit a first signaling. The fifth module 302 is configured to transmit a second signaling on each of M searched resources respectively, the second signaling including scheduling information of a target data, the target data being distributed in G time units in time domain, and the bandwidth occupied by the target data in each time unit being not greater than the bandwidth of one PRB. The sixth module 303 is configured to receive the target data, the second signaling being an uplink scheduling signaling, or is configured to transmit the target data, the second signaling being a downlink scheduling signaling.

In embodiment 10, the first signaling indicates a first time unit set, time units occupied by the M searched resources all belong to the first time unit set, the second signaling is a physical layer signaling, the searched resource is distributed in N time units in time domain, the bandwidth occupied by the searched resource in each time unit is not greater than the bandwidth of one PRB. The duration of the time unit is 1 millisecond. M, G and N are positive integers respectively. The first signaling is a higher layer signaling.

In another embodiment of Embodiment 10, the fourth module 301 is further configured to receive a third signaling and a fourth signaling. Herein, the third signaling identifies a second time unit set in a third time unit set, the first signaling identifies the first time unit set in the second time unit set, the G time units are behind a given time unit, the given time unit is the with time unit behind the last time unit in the M searched resources, and v is a positive integer. The fourth signaling indicates the third time unit set. The third time unit set includes all the time units that can be used for NB-IoT transmission on a target frequency band other than fixed time units, the target frequency band is a frequency band occupied by the target data. The fixed time units are time units used for the transmission of specific information for NB-IoT, and the specific information includes a synchronization sequence. The third signaling is a higher layer signaling.

In another embodiment of Embodiment 10, the fourth module 301 is further configured to receive a fifth signaling, the fifth signaling requesting to adjust the first time unit set. The adjusting is one of {adding time unit, reducing time unit, maintaining}. The fifth signaling is a physical layer signaling.

In another embodiment of Embodiment 10, the second signaling is an uplink scheduling signaling, G is a positive integer multiple of 6. The G time units include a positive integer number of time unit subsets, and each time unit subset consists of 6 LTE subframes.

In another embodiment of Embodiment 10, the fourth module 301 includes a controller/processor 475 in embodiment 12.

In another embodiment of Embodiment 10, the fourth module 301 includes a transmitting processor 416 in embodiment 12, a transmitter 418 in embodiment 12, and an antenna 420 in embodiment 12.

In another embodiment of Embodiment 10, the fifth module 302 includes transmitting processor 416 in embodiment 12, a transmitter 418 in embodiment 12, and an antenna 420 in embodiment 12.

In another embodiment of Embodiment 10, the sixth module 303 includes a receiving processor 470 in embodiment 12, a receiver 418 in embodiment 12, and an antenna 420 in embodiment 12.

Embodiment 11

Figure 11:
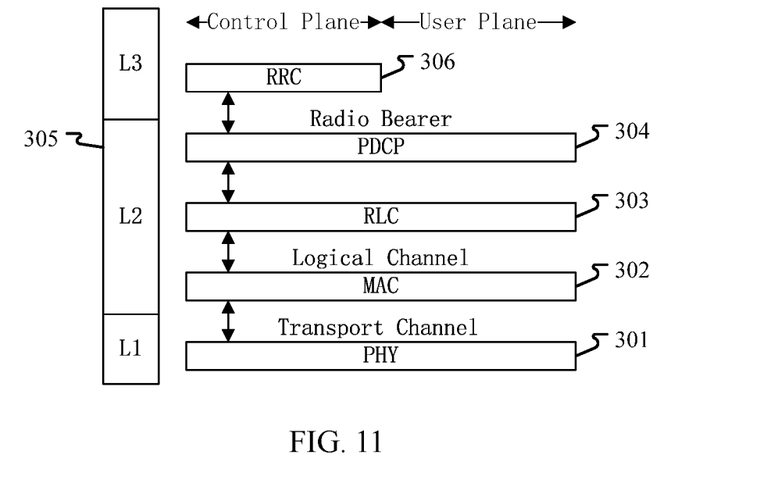
FIG. 11 is a structure diagram illustrating a radio protocol architecture of a user plane and a control plane.

Embodiment 11 is a structure diagram illustrating a radio protocol architecture of a user plane and a control plane, as shown in FIG. 11.

In FIG. 11, there are three layers: a L1 (layer 1) 301, a L2 (layer 2) 305 and a L3 (layer 3) 306. The L1 301 is the lowest layer to process the physical layer signal. The L2 305 is above the L1 301, which is in charge of the link between a UE and a base station via the L1 301. In the user plane, L2 305 includes a MAC (Medium Access Control) 302 sublayer, a RLC (Radio Link Control) 303 sublayer, and a PDCP (Packet Data Convergence Protocol) 304 sublayer. All the three sublayers end at the base station of the network side. Although not described in FIG. 11, the UE may include several higher layers above the L2 305, such as network layer ending at a P-GW213 and an application layer ending at the other side of the linkage (i.e. a peer UE, a server, etc.). The PDCP 304 sublayer provides the multiplexing among variable radio bearers and logical channels. The PDCP 304 also provides a header compression for a higher layer data packet so as to reduce a radio transmission overhead. The PDCP 304 also provides security via encrypting a data packet and provides UE handover between two base stations. The RLC 303 provides segmentation and reassembling of a higher layer data packet, retransmission of a lost data packet, reordering of a lost data packet. The MAC 302 provides the multiplexing between logical channels and transport channels. The MAC 302 may allocating radio resource (i.e., resource block) for the UE and HARQ operation.

In the control plane, a radio protocol architecture of a UE is almost the same as a radio protocol architecture of a base station for L1 301 and L2 305. The control plane also includes L3 (layer 3) 306, i.e., RRC (Radio Resource Control) sublayer. The L3 306 can schedule the radio resource via a RRC signaling.

In one embodiment, the radio protocol architecture in FIG. 11 is applicable for the UE of this invention.

In one embodiment, the radio protocol architecture in FIG. 11 is applicable for the base station of this invention.

Embodiment 12

Embodiment 12 is a illustration of a UE and base station, as shown in FIG. 12.

FIG. 12 describes a architecture of a UE 450 and a architecture of a base station 410 in the access network.

In downlink transmission, a packet from a higher layer is provided to a controller/processor 475. The controller/processor 475 provides a function of a layer 2. In downlink transmission, the controller/processor 475 provides header compression, encrypting, packet segmentation and reordering, multiplexing between logical channel and transport channel, and the resource allocation for the UE 450. The controller/processor 475 is in charge of HARQ operation, retransmission of the lost packet, and the signaling to the UE450. A transmitting processor 416 performs a signal processing function used for a layer 1. The signal processing function includes encoding and interleaving so as to ensure a FEC (Forward Error Correction) and a demodulation corresponding to a modulation scheme (i.e., BPSK, QPSK, M-QAM, etc.) at the UE 450 side. The encoded and modulated signals are divided into parallel streams, which are then mapping into radio resources (i.e., a subcarrier, multiple subcarriers, multiple code channels, multiple Resource Elements, etc.). The parallel streams can be used to generate spatial streams via precoding. The spatial streams can go through transmitter 418 and be sent to multiple antennas 420. Every transmitter 418 is used to transmit a corresponding RF (Radio Frequency) carrier.

At the UE 450 side, every receiver 454 receives signal via a corresponding antenna 452. Every receiver 454 recovers information modulated to RF carrier and provides the information to a receiving processor 456. The receiving processor 456 performs the signal processing function for layer 1. The receiving processor 456 performs spatial processing on the information to recover any spatial stream targeting the UE 450. If there are multiple spatial streams are targeting the UE 450, the multiple spatial streams can be assembled into a single symbol stream by the receiving processor 456. The symbol stream can be recovered and demodulated via determining the most possible transmitting symbol set by the base station 410. The symbol stream is then decoded and deinterleaved so as to recover a original data and signaling transmitted by the base station 410. The original data and signaling is then provided to a controller/processor 459. The controller/processor 459 performs a layer 2 operation. The controller/processor 459 can be connected to a memory 460 that stores programme code and data. The memory 460 is computer readable. In downlink transmission, the controller/processor 459 provides the multiplexing between the transport channel and the logical channel, packet reassembling, decrypting, header decompression, and control signaling processing so as to recover a packet coming from the higher layer. The packet coming from the higher layer is then provided to the higher layers above layer 2, or the control signaling is provided to layer 3 for processing. The controller/processor 459 can also perform error detection on a HARQ-ACK to support the HARQ operation.

In the uplink transmission, a data source 467 provides a packet from a higher layer to the controller/processor 459. The data source 467 illustrates all the protocol layers above layer 2. Similar as the function description of the base station 410 in downlink transmission, the controller/processor 459 provides a function of a layer 2 of control plane and user plane based on a resource allocation from the base station 410. In uplink transmission, the controller/processor 459 provides header compression, encrypting, packet segmentation and reordering, and multiplexing between logical channel and transport channel. The controller/processor 459 is in charge of HARQ operation, retransmission of the lost packet, and the signaling to the base station 410. A transmitting processor 468 selects suitable encoding and modulation schemes, and can generate a spatial stream. The spatial stream generated by the transmitting processor 468 is provided to different transmitters, and then different antennas. Each transmitter 454 corresponds to a single antenna 452.

The base station 410 applies the similar manner to perform uplink reception as the UE 450 to perform the downlink reception.

Every receiver 418 receives signal via a corresponding antenna 420. Every receiver 418 recovers information modulated to RF carrier, and provide the information to a receiving processor 470. The receiving processor 470 can perform layer 1. A controller/processor 475 perform layer 2. The controller/processor 475 can be connected to a memory 476 that stores programme code and data. The memory 476 is computer readable. In uplink transmission, the controller/processor 476 provides the multiplexing between the transport channel and the logical channel, packet reassembling, decrypting, header decompression, and control signaling processing so as to recover a packet coming from the higher layer of the UE 450. The packet coming from the higher layer may be provided to the core network. The controller/processor 475 can also perform error detection on a HARQ-ACK to support the HARQ operation.

The ordinary skill in the art may understand that all or part steps in the above method may be implemented by instructing related hardware through a program; the program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. This disclosure is not limited to any combination of hardware and software in specific forms. The UE in the disclosure includes but not limited to Things of Internet terminals, Machine Type Communication (MTC) terminals, vehicle communication equipment, wireless sensors, Internet cards, mobile phones, tablet computers, notebooks and other wireless communication equipment. The base station in the disclosure includes but not limited to macro-cellular base stations, micro-cellular base stations, home base stations, relay base station and wireless communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) supporting narrowband communication, comprising the following steps:
   receiving a fourth signaling indicating a third time unit set, wherein the third time unit set comprises all the time units, other than fixed time units, to be used for NarrowBand Internet of Things (NB-IoT) transmission of target data on a target frequency band, the fixed time units are time units used for the transmission of specific information for NB-IoT, and the specific information comprises a synchronization sequence;
   receiving a first signaling, wherein the first signaling indicates a first time unit set, time units occupied by M searched resources all belong to the first time unit set;
   searching for a second signaling on the M searched resources, the second signaling comprising scheduling information of said target data, the target data being distributed in G time units in time domain, and the bandwidth occupied by said target data in each time unit being not greater than the bandwidth of one Physical Resource Block (PRB); wherein the second signaling is a physical layer signaling, the searched resource is distributed in N time units in time domain, the bandwidth occupied by the searched resource in each time unit is not greater than the bandwidth of one PRB, the duration of the time unit is 1 millisecond, and M, G and N are positive integers respectively;
   the method in the UE supporting narrowband communication further comprises the following steps in response to detecting said second signaling:
      transmitting said target data, the second signaling being an uplink scheduling signaling; or, receiving said target data, the second signaling being a downlink scheduling signaling.

2. The method in a UE supporting narrowband communication according to claim 1, wherein the step of receiving a fourth signaling further comprises:
   receiving a third signaling; wherein the third signaling indicates a second time unit set, the first signaling identifies the first time unit set in the second time unit set, the G time units are behind a given time unit, the given time unit is the $v_{th}$ time unit behind the last time unit in the M searched resources, and v is a positive integer.

3. The method in a UE supporting narrowband communication according to claim 1, wherein the first signaling identifies one time unit group that appears periodically in the third time unit set, and the time unit group is composed of a positive integer number of time units.

4. The method in a UE supporting narrowband communication according to claim 1, wherein the scheduling information identifies the G time units in a target time unit set, time units in the second time unit set belong to the third time unit set, the target time unit set is composed of all the time units in the third time unit set but outside the second time unit set, the G time units are continuous in the target time unit set.

5. The method in a UE supporting narrowband communication according to claim 1, wherein the specific information includes at least one of {physical broadcast information, system information}.

6. A method in a base station supporting narrowband communication, comprising:
   transmitting a fourth signaling indicating a third time unit set, wherein the third time unit set comprises all the time units, other than fixed time units, to be used for NarrowBand Internet of Things (NB-IoT) transmission on a target frequency band, the fixed time units are time units used for the transmission of specific information for NB-IoT, and the specific information comprises a synchronization sequence;
   transmitting a first signaling, wherein the first signaling indicates a first time unit set, time units occupied by M searched resources all belong to the first time unit set;
   transmitting a second signaling on each of the M searched resources respectively, the second signaling comprising scheduling information of said target data, the target data being distributed in G time units in time domain, and the bandwidth occupied by said target data in each time unit being not greater than the bandwidth of one Physical Resource Block (PRB); wherein the second signaling is a physical layer signaling, the searched resource is distributed in N time units in time domain, the bandwidth occupied by the searched resource in each time unit is not greater than the bandwidth of one Physical Resource Block (PRB), the duration of the time unit is 1 millisecond, and M, G and N are positive integers respectively;
   receiving said target data, the second signaling being an uplink scheduling signaling; or, transmitting said target data, the second signaling being a downlink scheduling signaling.

7. The method in a base station supporting narrowband communication according to claim 6, wherein the step of transmitting a fourth signaling further comprises: transmitting a third signaling; wherein the third signaling indicates a second time unit set, the first signaling identifies the first time unit set in the second time unit set, the G time units are behind a given time unit, the given time unit is the $v_{th}$ time unit behind the last time unit in the M searched resources, and v is a positive integer.

8. The method in a base station supporting narrowband communication according to claim 6, wherein the first signaling identifies one time unit group that appears periodically in the third time unit set, and the time unit group is composed of a positive integer number of time units.

9. The method in a base station supporting narrowband communication according to claim 6, wherein the scheduling information identifies the G time units in a target time unit set, time units in the second time unit set belong to the third time unit set, the target time unit set is composed of all the time units in the third time unit set but outside the second time unit set, the G time units are continuous in the target time unit set.

10. The method in a base station supporting narrowband communication according to claim 6, wherein the specific information includes at least one of {physical broadcast information, system information}.

11. A User Equipment (UE) supporting narrowband communication, comprising:
hardware including a processing system and one or more antennas, the hardware being configured to perform operations comprising:
receiving a fourth signaling indicating a third time unit set, wherein the third time unit set comprises all the time units, other than fixed time units, to be used for NarrowBand Internet of Things (NB-IoT) transmission of target data on a target frequency band, the fixed time units are time units used for the transmission of specific information for NB-IoT, and the specific information comprises a synchronization sequence; and said first module is further configured to receive a first signaling, wherein the first signaling indicates a first time unit set, time units occupied by M searched resources all belong to the first time unit set;
searching for a second signaling on the M searched resources, the second signaling comprising scheduling information of said target data, the target data being distributed in G time units in time domain, and the bandwidth occupied by said target data in each time unit being not greater than the bandwidth of one Physical Resource Block (PRB), wherein the second signaling is a physical layer signaling, the searched resource is distributed in N time units in time domain, the bandwidth occupied by the searched resource in each time unit is not greater than the bandwidth of one Physical Resource Block (PRB), the duration of the time unit is 1 millisecond, and M, G and N are positive integers respectively;
in response to detecting said second signaling, the hardware being further configured to transmit said target data, the second signaling being an uplink scheduling signaling, or to receive said target data, the second signaling being a downlink scheduling signaling.

12. The UE supporting narrowband communication according to claim 11, wherein the first signaling identifies one time unit group that appears periodically in the third time unit set, and the time unit group is composed of a positive integer number of time units.

13. The UE supporting narrowband communication according to claim 11, wherein the scheduling information identifies the G time units in a target time unit set, time units in the second time unit set belong to the third time unit set, the target time unit set is composed of all the time units in the third time unit set but outside the second time unit set, the G time units are continuous in the target time unit set.

14. The UE supporting narrowband communication according to claim 11, wherein the specific information includes at least one of {physical broadcast information, system information}.

15. A base station apparatus supporting narrowband communication, comprising:
hardware including a processing system and one or more antennas, the hardware being configured to perform operations comprising:
transmitting a fourth signaling indicating a third time unit set, wherein the third time unit set comprises all the time units, other than fixed time units, to be used for NarrowBand Internet of Things (NB-IoT) transmission on a target frequency band, the fixed time units are time units used for the transmission of specific information for NB-IoT, and the specific information comprises a synchronization sequence; and said first module is further configured to transmit a first signaling, wherein the first signaling indicates a first time unit set, time units occupied by M searched resources all belong to the first time unit set;
transmitting a second signaling on each of the M searched resources respectively, the second signaling comprising scheduling information of said target data, the target data being distributed in G time units in time domain, and the bandwidth occupied by said target data in each time unit being not greater than the bandwidth of one Physical Resource Block (PRB), wherein the second signaling is a physical layer signaling, the searched resource is distributed in N time units in time domain, the bandwidth occupied by the searched resource in each time unit is not greater than the bandwidth of one PRB, the duration of the time unit is 1 millisecond, and M, G and N are positive integers respectively;
receiving said target data, the second signaling being an uplink scheduling signaling, or to transmitting said target data, the second signaling being a downlink scheduling signaling.

16. The base station apparatus supporting narrowband communication according to claim 15, wherein the first signaling identifies one time unit group that appears periodically in the third time unit set, and the time unit group is composed of a positive integer number of time units.

17. The base station apparatus supporting narrowband communication according to claim 15, wherein the scheduling information identifies the G time units in a target time unit set, time units in the second time unit set belong to the third time unit set, the target time unit set is composed of all the time units in the third time unit set but outside the second time unit set, the G time units are continuous in the target time unit set.

18. The base station apparatus supporting narrowband communication according to claim 15, characterized in that: the specific information includes at least one of {physical broadcast information, system information}.

* * * * *

UNITED STATES PATENT AND TRADEMARK OFFICE
CERTIFICATE OF CORRECTION

PATENT NO. : 10,826,665 B2  
APPLICATION NO. : 15/959302  
DATED : November 3, 2020  
INVENTOR(S) : Xiaobo Zhang Page 1 of 1

It is certified that error appears in the above-identified patent and that said Letters Patent is hereby corrected as shown below:

In the Specification

In Column 3, Line 27, delete "the with time unit" and insert -- the $v_{th}$ time unit --, therefor.

In Column 6, Line 43, delete "the with time unit" and insert -- the $v_{th}$ time unit --, therefor.

In Column 8, Lines 2-3, delete "the with time unit" and insert -- the $v_{th}$ time unit --, therefor.

In Column 8, Line 55, delete "the with time unit" and insert -- the $v_{th}$ time unit --, therefor.

In Column 11, Line 12, delete "the with time unit" and insert -- the $v_{th}$ time unit --, therefor.

In Column 15, Line 27, delete "the with time unit" and insert -- the $v_{th}$ time unit --, therefor.

In Column 16, Line 25, delete "the with time unit" and insert -- the $v_{th}$ time unit --, therefor.

In Column 18, Line 54, delete "provide" and insert -- provides --, therefor.

In the Claims

In Column 21, Lines 24-25, delete "and said first module is further configured to receive a first signaling" and insert -- and receiving a first signaling, --, therefor.

In Column 22, Lines 19-20, delete "and said first module is further configured to receive a first signaling" and insert -- and receiving a first signaling, --, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*